United States Patent Office 3,421,389
Patented Jan. 14, 1969

3,421,389
VARIABLE SPEED DRIVE
Jean Fauchere, Bourg-la-Reine, France, assignor to Societe Anonyme dite: Richier, Paris, France, a French company of France
Filed Sept. 6, 1966, Ser. No. 577,288
Claims priority, application France, Sept. 9, 1965, 30,941
U.S. Cl. 74—665    3 Claims
Int. Cl. B16h 47/04; B16d 27/00

ABSTRACT OF THE DISCLOSURE

A variable speed drive is provided by a novel interrelationship of a fixed volumetric pump with a plurality, $n$, of fixed volumetric motors in combination with a corresponding number of gear, clutch, and brake sets, to produce $2^n - 1$ output ratios on a driven shaft.

---

This invention relates to a device for driving a shaft by means of a volumetric hydraulic pump, whereby the operation of simple controls makes it possible to select, from a range of ratios between the speeds of the pump and of the driven shaft, that particular ratio which is most suitable for the work to be done by the driven shaft.

This device comprises a number of hydraulic motors fed in parallel by the pump, a system of gears which has the driven shaft as its output shaft and which transmits rotary motion positively to this driven shaft from shafts on the input side of the gear system, the number of input shafts being the same as the number of motors and each motor being provided with controls enabling its shaft to be positively connected to one of the gear input shafts or enabling the motor to be cut out of circuit.

By the operation of the controls, the drive from any or all of the hydraulic motors can be applied to the driven shaft. Thus, if there are $n$ hydraulic motors, there are $2^n - 1$ possible forms of drive, providing an extensive range of transmission ratios between the speeds of rotation of the pump and of the driven shaft. These transmission ratios can be fixed according to the desired scale by a judicious choice of capacity for the various motors (corresponding in each case to one complete revolution) and of the ratios between the numbers of teeth in the pairs of spurs and pinions or wheels in mesh in the gear system.

One preferred embodiment of the invention incorporates three hydraulic motors and provides a range of seven transmission ratios.

The features and advantages of the invention will be more fully apparent from the description given hereunder, by way of example only, in conjunction with the accompanying diagrammatic drawings of the device which is an arrangement of hydraulic motors for driving a shaft, in accordance with the invention.

Figure 1:
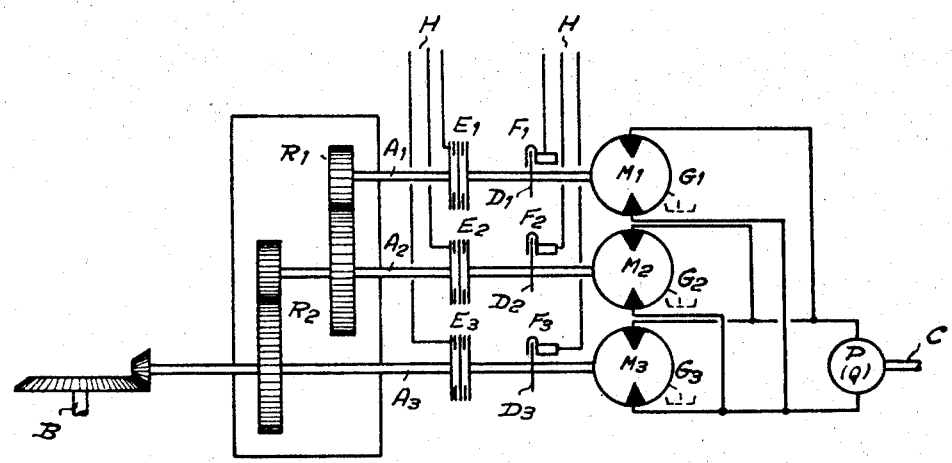
Figure 2:
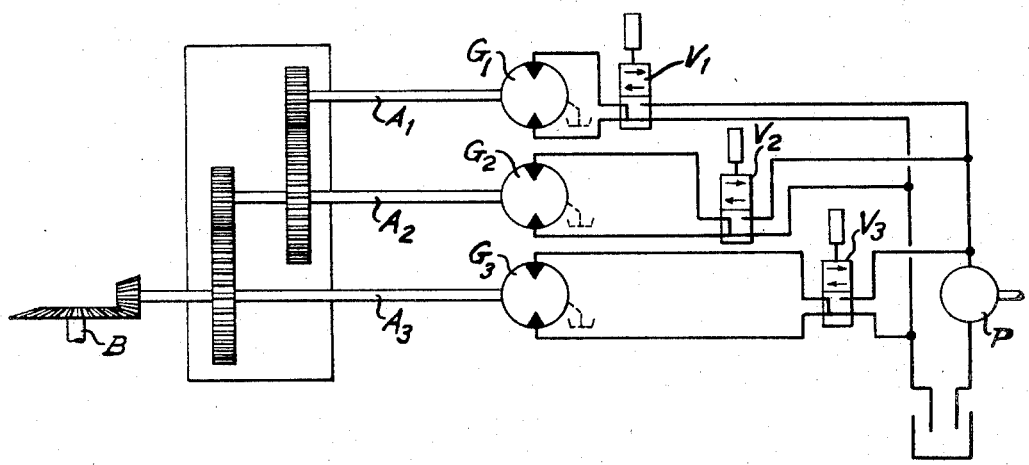

In the accompanying drawings, FIG. 1 illustrates diagrammatically one modification of the present invention in plan view comprising clutch and brake means for the controlled selective coupling of the motor shafts to the gear train; and FIG. 2, a similar diagrammatic plan view of a further modification wherein the control means comprise a distributor in place of the brake and clutch arrangement illustrated in FIG. 1.

As shown in FIG. 1, the device comprises a volumetric pump P, which, for every revolution of its shaft C, delivers a volume of liquid Q, under pressure and which supplies in parallel three hydraulic motors $M_1$, $M_2$ and $M_3$, each of which makes one revolution when traversed by a flow of hydraulic fluid designated $G_1$, $G_2$ and $G_3$ respectively. Opposite each of the motors $M_1$, $M_2$ and $M_3$ are mounted three shafts, $A_1$, $A_2$ and $A_3$, on the input side of a gear train $R_1/R_2$, by which rotary motion is positively transmitted from these three shafts to a driven shaft B. The transmission ratio between shafts $A_1$ and $A_2$, mounted opposite motors $M_1$ and $M_2$ respectively, is $1/x$ and that between shafts $A_2$ and $A_3$, which latter is mounted opposite motor $M_3$, is $1/y$. The shaft of each of the motors, such as $M_1$, is fitted with a coupling (a clutch, for example) such as $E_1$, by which its rotary motion can be positively transmitted to shaft $A_1$ on the input side of the gear train, while the clutch action disengages the motor shaft $M_1$ and it simultaneously controls the operation of a brake $F_1$, which acts on disc $D_1$ on the shaft of the motor $M_1$ and prevents that shaft from turning. As the drawing shows, these clutches and brakes, such as $E_1$ and $F_1$, can be simultaneously remotely controlled by way of pressure pipes H.

The operation of clutches $E_1$, $E_2$ and $E_3$ and brakes $F_1$, $F_2$ and $F_3$ enables any or all of the three motors $M_1$, $M_2$ and $M_3$ to be brought into action.

If, for instance, the three clutches are so operated as to bring all three motors $M_1$, $M_2$ and $M_3$ into action, the passage of a quantity $G_3$ of fluid into the motor $M_3$ will cause the input shaft $A_3$ to make one complete revolution, the input shaft $A_2$ will make $y$ revolutions, corresponding to the passage of a quantity $yG_2$ of fluid into the motor $M_2$, and the input shaft $A_1$ will make $xy$ revolutions, corresponding to the passage of a quantity of $xyG_1$ of fluid into the motor $M_1$. The completion of one revolution of the shaft $A_3$ thus corresponds to a pump delivery of $$G_3 + yG_2 + xyG_1$$

and this shaft will thus rotate at a ratio of input to output speed of $$N = \frac{Q}{G_3 + yG_2 + xyG_1}$$

This is the lowest transmission ratio provided by the device.

The ratios N provided by the other six combinations in which the motors $M_1$, $M_2$ and $M_3$ can be used may be calculated similarly; their values for all seven combinations are tabulated below.

| Motors in operation | Value of N |
|---|---|
| $M_1$, $M_2$ and $M_3$ | $\dfrac{Q}{G_3 + yG_2 + xyG_1}$ |
| $M_1$ and $M_2$ | $\dfrac{Q}{y(G_1 x + G_2)} = \dfrac{Q}{yG_2 + xyG_1}$ |
| $M_3$ and $M_1$ | $\dfrac{Q}{G_3 + xyG_1}$ |
| $M_3$ and $M_2$ | $\dfrac{Q}{G_3 + yG_2}$ |
| $M_1$ | $\dfrac{Q}{xyG_1}$ |
| $M_2$ | $\dfrac{Q}{yG_2}$ |
| $M_3$ | $\dfrac{Q}{G_3}$ |

Various modifications could be made to the foregoing specification without thereby departing from the scope of the invention. In particular, the uncoupling of one of the motor shafts from the corresponding shaft on the input side of the gear train, instead of being accompanied by the braking of that motor shaft, might automatically cut off the feed from the motor, by the action of a suitable distributor.

This is illustrated in FIG. 2 of the accompanying drawings, wherein similar reference characters to those in FIG. 1 indicate similar means and also wherein, in place of the clutch and brake devices distributors $V_1$, $V_2$ and $V_3$ indicate diagrammatically the means for cutting off the fluid supply to each of the motors.

I claim:
1. In a variable speed drive, in combination, a fixed volumetric pump, a plurality, $n$, of fixed volumetric motors fed in parallel by said pump, a gear train comprising a corresponding number of gears driven by said motors and arranged to produce $2^n-1$ output ratios in an output shaft, and means for selectively coupling said motors to said gear train.

2. In the variable speed drive of claim 1, control means for selectively coupling said motors to said gear train comprising a number, corresponding to the number of motors, of clutch and brake sets.

3. In the variable speed drive of claim 1, control means for selectively coupling said motors to said gear train comprising a distributor arrangement adapted to cut off the feed from said pump to said motors.

References Cited
UNITED STATES PATENTS

| | | |
|---|---|---|
| 2,366,272 | 1/1945 | Le Tourneau. |
| 2,748,621 | 6/1956 | Sinclair _____ 74—732 |
| 2,970,641 | 2/1961 | Rosen et al. _____ 60—53 |

FOREIGN PATENTS 532,656    9/1931    Germany.

OTHER REFERENCES

German printed application: Brook et al., 10, 632 XI/65f², May 24, 1956.

BENJAMIN W. WYCHE III, *Primary Examiner.*

U.S. Cl. X.R.

60—53; 91—411, 414; 192—18